(12) United States Patent
Schlitzkus et al.

(10) Patent No.: US 7,510,163 B2
(45) Date of Patent: Mar. 31, 2009

(54) DEVICE FOR THE ELASTIC MOUNTING OF A HYDRAULIC UNIT IN A MOTOR VEHICLE BRAKING SYSTEM ON A VEHICLE

(75) Inventors: Michael Schlitzkus, Dietmannsried (DE); Rainer Schwarz, Immenstadt (DE); Andreas Weh, Durach (DE)

(73) Assignee: Robert Bosch GmbH, Stuttgart (DE)

( * ) Notice: Subject to any disclaimer, the term of this patent is extended or adjusted under 35 U.S.C. 154(b) by 907 days.

(21) Appl. No.: 10/333,718

(22) PCT Filed: Jun. 19, 2001

(86) PCT No.: PCT/DE01/02265

§ 371 (c)(1),
(2), (4) Date: Apr. 14, 2003

(87) PCT Pub. No.: WO02/10610

PCT Pub. Date: Feb. 7, 2002

(65) Prior Publication Data

US 2003/0155809 A1    Aug. 21, 2003

(30) Foreign Application Priority Data

Jul. 27, 2000    (DE) .................... 100 36 575

(51) Int. Cl.
*F16M 13/00* (2006.01)
(52) U.S. Cl. ............... 248/635; 248/548; 248/638; 248/560; 248/674; 267/141; 403/279; 403/281; 411/544; 303/116.4
(58) Field of Classification Search .......... 248/548, 248/544, 559, 562, 608, 611, 613, 614, 619, 248/621, 632, 638, 635, 609, 560, 674, 673, 248/220.21, 671; 267/141, 153, 141.1, 141.6; 403/279, 280, 281, 282, 408.1, 396; 411/544, 411/371.1, 368, 369; 303/116.4

See application file for complete search history.

(56) References Cited

U.S. PATENT DOCUMENTS

| 1,778,992 | A | * | 10/1930 | Wulfert | ............ 248/635 |
|---|---|---|---|---|---|
| 2,662,988 | A | * | 12/1953 | McKim | ............ 310/91 |
| 2,810,536 | A | * | 10/1957 | Cunningham | ............ 248/671 |
| 2,893,722 | A | * | 7/1959 | Beck | ............ 267/153 |
| 3,128,999 | A | * | 4/1964 | Schmitt | ............ 267/153 |
| 3,350,042 | A |   | 10/1967 | Stewart |   |
| 3,756,551 | A | * | 9/1973 | Bishop | ............ 267/141.1 |

(Continued)

FOREIGN PATENT DOCUMENTS

DE    197 24 177 A1    12/1998

(Continued)

*Primary Examiner*—Kimberly T. Wood
(74) *Attorney, Agent, or Firm*—Ronald E. Greigg

(57) ABSTRACT

A hydraulic unit is elastically supported by means of elastomer elements, through which bolts pass, on two legs of a mounting bracket that extend perpendicular to one another. The leg of the mounting bracket has recesses, open counter to the mounting direction of the unit, for receiving the elastomer element. With clamping means disposed on the bolt, the elastomer element is axially shortened and pressed against both the recess and side faces, located on either side of the recess, of the leg of the mounting bracket. With the shortened elastomer element, a positive and nonpositive engagement with the leg of the mounting bracket is achieved.

7 Claims, 3 Drawing Sheets

U.S. PATENT DOCUMENTS

| | | | |
|---|---|---|---|
| 3,895,408 A * | 7/1975 | Leingang | 16/2.1 |
| 4,067,531 A * | 1/1978 | Sikula | 220/378 |
| RE31,525 E * | 2/1984 | Boyd et al. | 248/581 |
| 4,521,004 A * | 6/1985 | Caldwell | 267/141.4 |
| 5,417,401 A * | 5/1995 | Thompson et al. | 248/674 |
| 5,464,187 A * | 11/1995 | Linkner, Jr. | 248/635 |
| 5,634,695 A * | 6/1997 | Ohta et al. | 303/10 |
| 5,683,215 A * | 11/1997 | Gaignard et al. | 411/34 |
| 5,685,150 A | 11/1997 | Hinz | |
| 5,697,678 A * | 12/1997 | Huber | 303/116.4 |
| 5,722,631 A * | 3/1998 | Dorton | 248/635 |
| 6,029,942 A * | 2/2000 | Daddis et al. | 248/635 |
| 6,098,949 A * | 8/2000 | Robinson | 248/635 |
| 6,471,179 B1 * | 10/2002 | Tousi et al. | 248/635 |
| 6,557,815 B1 * | 5/2003 | Klein, II | 248/635 |
| 2002/0190572 A1 * | 12/2002 | Nakazawa | 303/116.4 |

FOREIGN PATENT DOCUMENTS

| | | |
|---|---|---|
| EP | 0 715 086 A1 | 6/1996 |
| FR | 1260978 | 6/1960 |
| GB | 414819 | 8/1934 |
| JP | 2001213293 A * | 8/2001 |
| WO | WO 98/12467 | 3/1998 |
| WO | WO 0210610 | 2/2002 |

* cited by examiner

DEVICE FOR THE ELASTIC MOUNTING OF A HYDRAULIC UNIT IN A MOTOR VEHICLE BRAKING SYSTEM ON A VEHICLE

CROSS-REFERENCE TO RELATED APPLICATIONS

This application is a 35 USC 371 application of PCT/DE 01/02265 filed on Jun. 19, 2001.

BACKGROUND OF THE INVENTION

1. Field of the Invention

The invention is directed to an improved resilient mounting device and more particularly to such a device for elastically mounting a hydraulic unit of a vehicle brake system.

2. Description of the Prior Art

One apparatus of the type with which this invention is concerned is already known (German Patent Disclosure DE 197 24 177 A1), which has a mounting bracket with one rib at the bottom and two legs protruding at right angles from the rib and spaced apart from one another. One bearing shell open at the top is embodied in each of the legs. The rib, conversely, is provided with an upward-oriented bolt. A hydraulic unit of a vehicle brake system is inserted into the mounting bracket from above. In the process, the bolt, with the interposition of a bushlike elastomer element, engages a recess on the underside of the unit. In the bearing shells of the legs, conversely, bushlike elastomer elements are received which are secured to two side faces, remote from one another, of the unit by means of screws. For securing the position of the unit in the mounting bracket, the bearing shells have clips on their open side fitting over them that are secured with detent engagement to the legs of the mounting bracket.

In the engine compartment of the vehicle, the mounting bracket is mounted on the body of the vehicle.

SUMMARY OF THE INVENTION

The apparatus of the invention has the advantage over the prior art that solely by deformation of the respective elastomer element, a positive and nonpositive connection is made between the hydraulic unit and the mounting bracket. Separate components for securing the position of the unit are therefore unnecessary.

With one embodiment of the apparatus, a three-point mounting of the unit is created, in which the elastomer elements, received on the second leg of the mounting bracket, can be associated with one end face of the unit, which contributes to minimizing the requisite installation space for the unit in the vehicle.

Expedient shapes for the elastomer element and the clamping means are also disclosed.

With one refinement of the invention, a component group is created that can be installed and tested separately from the unit.

BRIEF DESCRIPTION OF THE DRAWINGS

One exemplary embodiment of the invention is explained in further detail in the ensuing description, taken in conjunction with the drawings, in which.

DESCRIPTION OF THE PREFERRED EMBODIMENT

Figure 1:
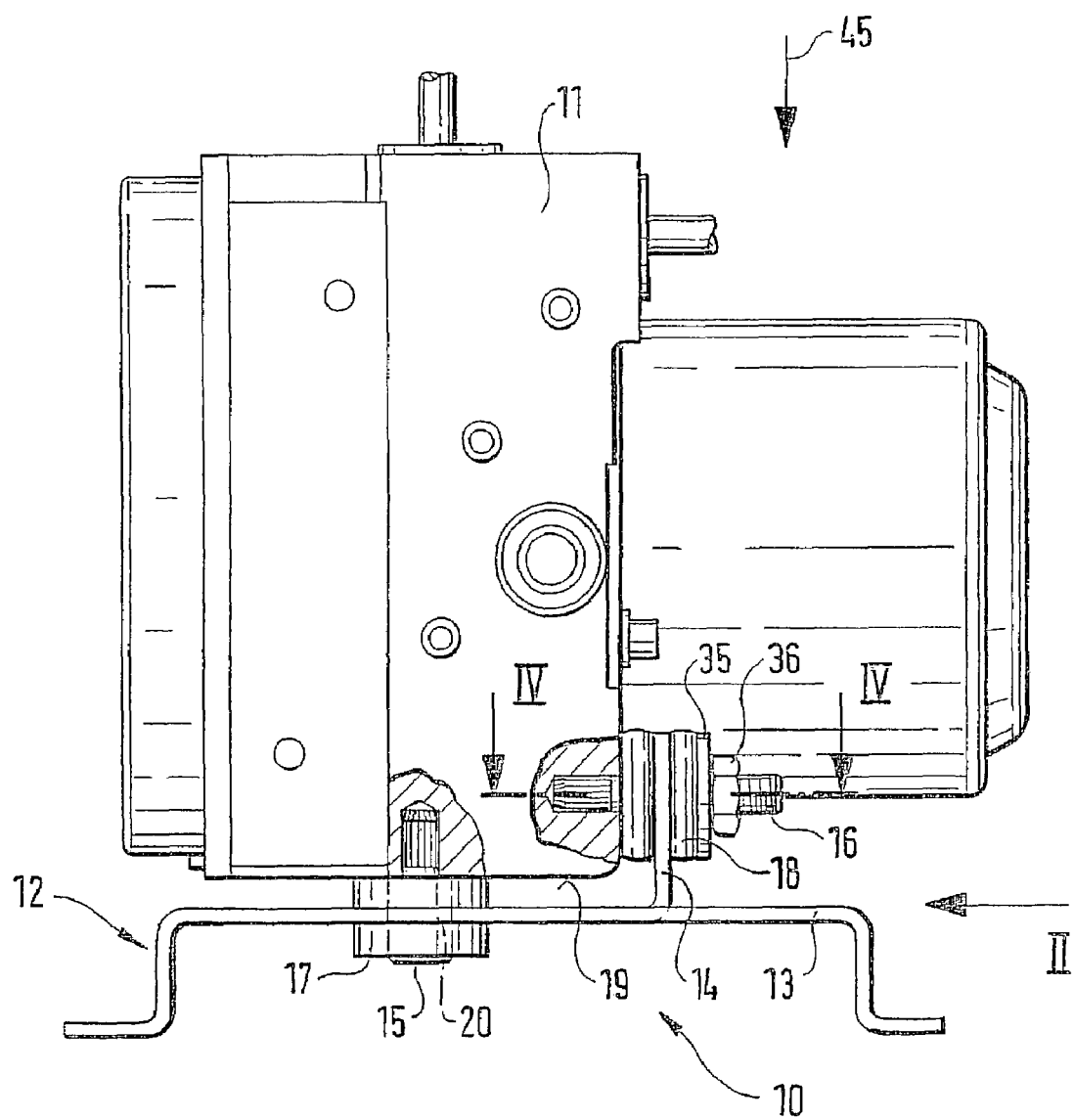
FIG. 1, in a side view, shows an apparatus for elastic mounting of a hydraulic unit of a vehicle brake system by means of a mounting bracket.
Figure 2:
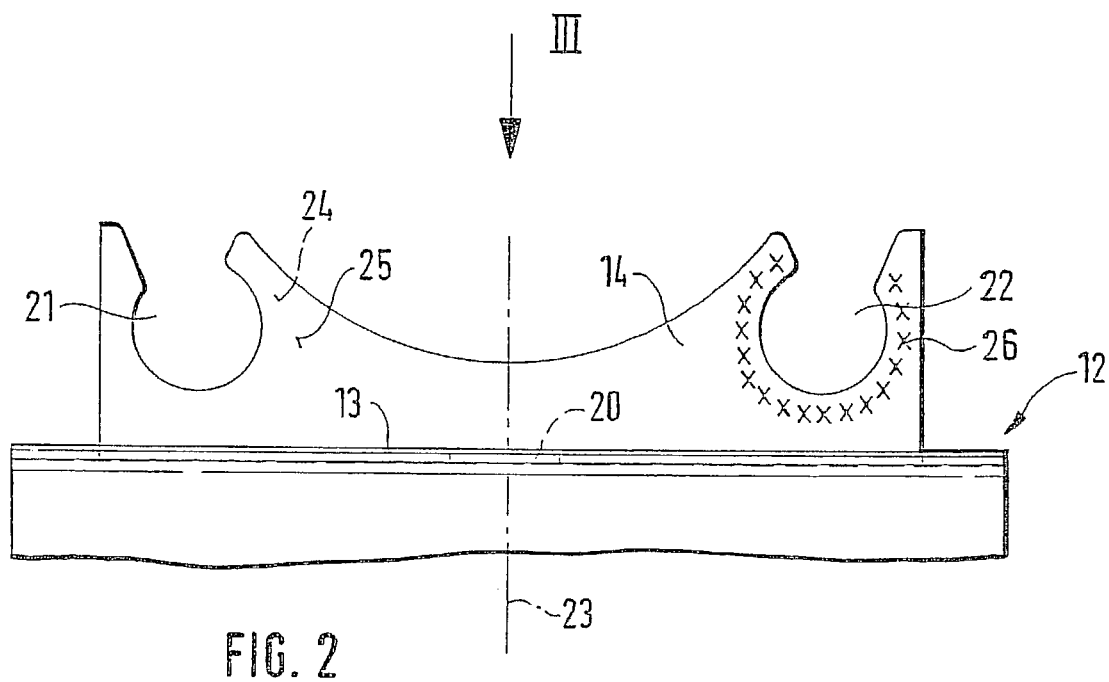
FIG. 2 shows a portion of the mounting bracket of a larger scale, seen in the direction of arrow II in FIG. 1.
Figure 3:
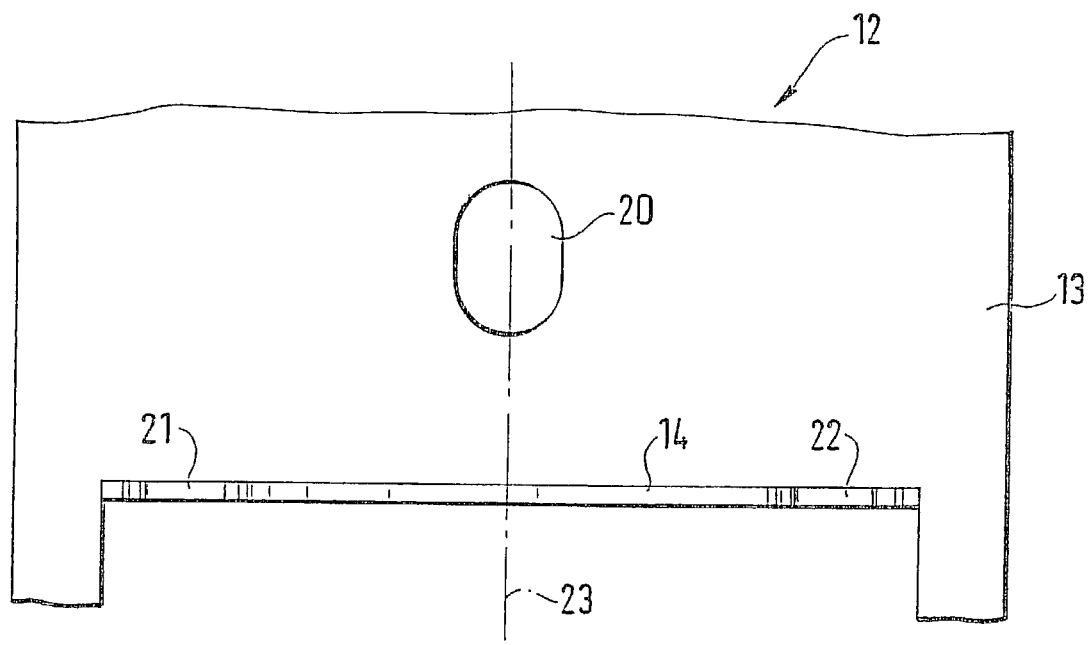
FIG. 3 is a plan view on the portion of the mounting bracket, viewed in the direction of the arrow III in FIG. 2.

An apparatus 10, shown in FIG. 1 of the drawing, for elastic mounting of a hydraulic unit 11 of a vehicle brake system, not otherwise shown, has a mounting bracket 12, which as is only suggested schematically in the drawing is solidly connected to a body of a vehicle. The mounting bracket 12 has two legs 13 and 14, extending perpendicular to one another, on which the unit 11 is supported by means of elastomer elements 17 and 18 through which respective bolts 15 and 16 pass. The bolt 15 located on the underside 19 of the unit 11 is press-fitted over part of its length into this unit and passes through the hollow-cylindrical elastomer element 17. The latter is snapped into an opening 20, in the form of an oval or elliptical oblong slot, in the first leg 13 that extends parallel to the underside 19 of the mounting bracket 12, the mounting bracket being embodied as a shaped sheet-metal part. Two spaced-apart recesses 21 and 22 are embodied on the second leg 14, which protrudes upward from the first leg 13 of the mounting bracket 12; these recesses are symmetrical to a plane 23, extending perpendicular to the plane of this leg 14, in which plane 23 the bolt 15 and the oblong slot of the opening 20 extends with its longitudinal axis (FIGS. 2 and 3). The two recesses 21 and 22 have an approximately circular outline that is open at the top. In the region of the two recesses 21, 22, the side faces 24 and 25 of the second leg 14 can be provided with impressions 26, as schematically indicated in FIG. 2 for the recess 22. The bolts 16 and elastomer elements 18, of which there are two each, corresponding to the number of the two recesses 21 and 22, are structurally identical; the ensuing description therefore refers to the components mounted in both places.

Figure 4:
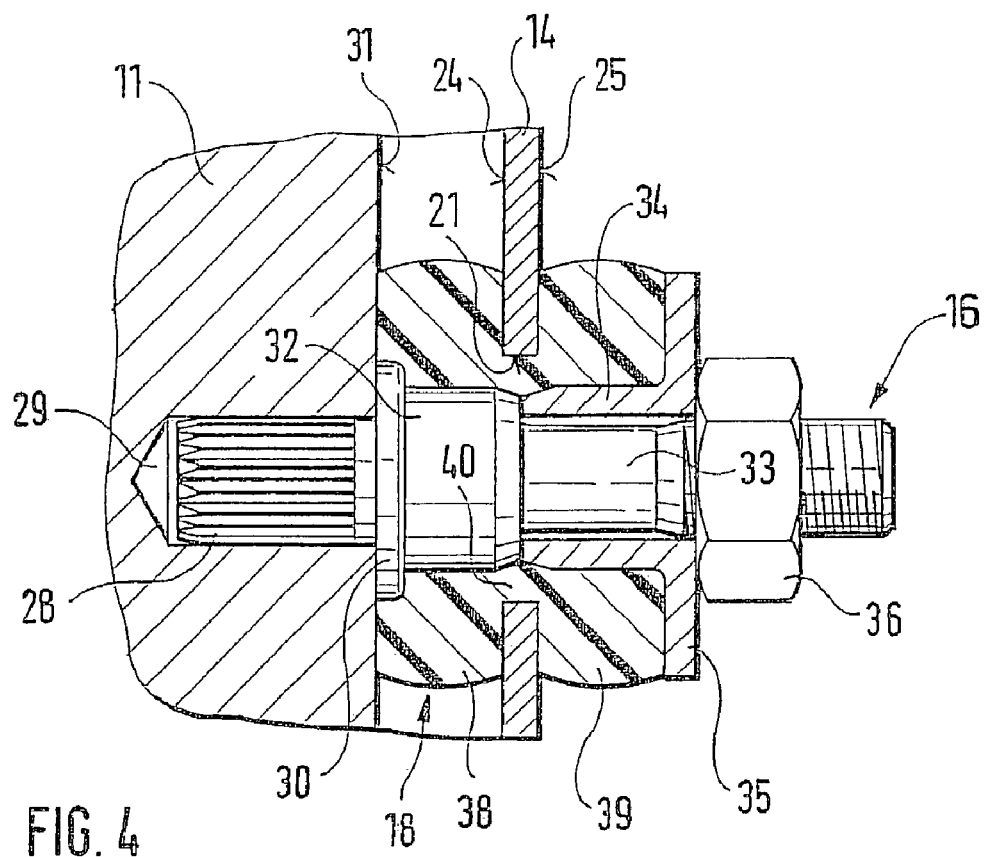
FIG. 4 is a section on a larger scale taken along the line IV-IV in FIG. 1 through axially braced fastening means of the unit.

The bolt 16 has a longitudinally fluted press-fit peg 28, with which it is received nonrotatably with a press fit in a receiving bore 29 of the unit 11 (FIG. 4). In a departure from the exemplary embodiment, the peg 28 can be provided with a threaded portion, and the bolt 16 can be secured in the unit 11 by means of a screw connection. The press-fit peg 28 is adjoined by a larger-diameter plate 30 of the bolt 16, with which the bolt is braced axially on an end face 31 of the unit 11 extending perpendicular to the underside 19. The plate 30 is followed by a reduced-diameter portion 32, at which a screw shaft 33 of still further reduced diameter begins. The elastomer element 18, a bush 36 with a flange 35, and a nut 36 are received on the bolt 16. These components form a component group 37 serving as a fastening means for fastening the unit 11 to the second leg 14 of the mounting bracket; this component group can be preassembled in a form shown in FIG. 5 before being mounted on the unit.

The elastomer element 18 joined to the bolt 16 has two end portions 38, 39 of equal diameter, which are joined by a middle portion 40 of smaller diameter. As a result of this shaping, the hollow-cylindrical element 18 has an annular groove 41, extending all the way around, whose diameter is greater by a certain extent at the bottom than the diameter of the respective recess 21 and 22 in the second leg 14 of the mounting bracket 12, and whose width is greater than the thickness of the second leg.

Figure 5:
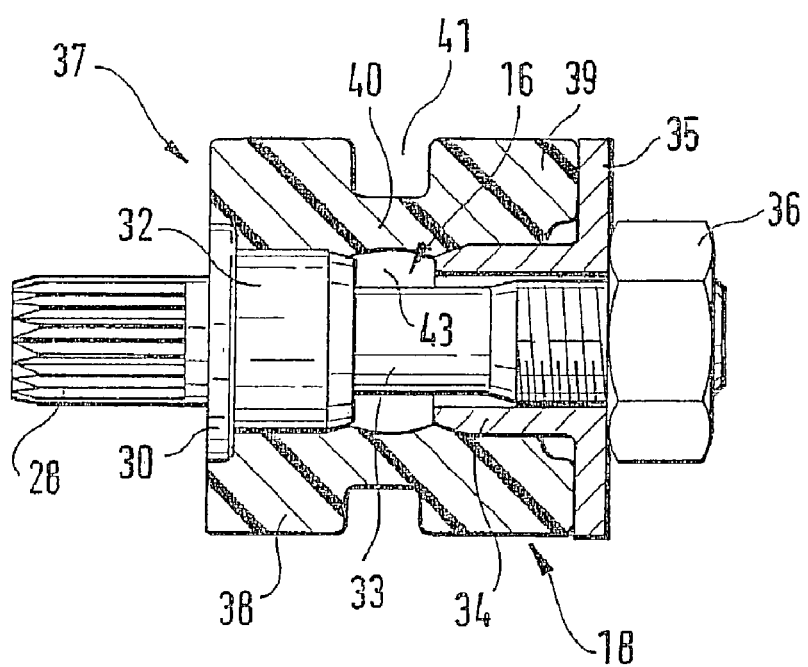
FIG. 5 shows the fastening means of FIG. 4 but as an unbraced component unit.

In the preassembled state, the elastomer element 18 is received axially unbraced on the bolt 16 (FIG. 5). With its one end portion 38, it surrounds both the portion 32, fittingly engaging its inside cross section, and the plate 30 of the bolt 16. The bush 34 slipped onto the bolt 16 has the same outer diameter as the portion 32 and passes fittingly through the other end portion 39 of the elastomer element 18. The flange 35 is adapted to the outside diameter of the elastomer element 18. The bush 34 with the flange 35 and the nut 36 form clamping means with which the elastomer element 18 can be axially shortened (FIG. 4).

As FIG. 5 clearly shows, the bush 34, adapted fittingly to the axial length of the portion 39, is spaced apart from the portion 32 that together with the plate 30 extends axially over the length of the end portion 38 of the elastomer element 18. The result, in the unbraced state of the elastomer element 18, is an annular gap 43, associated with the middle portion 40 and enveloping the screw shaft 33 of the bolt 16, so that in the state during assembly shown in FIG. 5 the elastomer element 18 yields radially inward in the region of its middle portion 40.

For mounting the hydraulic unit 11 on the mounting bracket 12, the bolt 15 and two component groups 37, described above in conjunction with FIG. 5, and comprising the bolt 16, elastomer element 18, bush 34 with flange 35, and nut 36, are joined to the unit 11. The elastomer element 17, associated with the bolt 15 located on the underside of the unit 11, can be slipped onto the bolt, or it can already be snapped into the opening 20 on the first leg 13 of the mounting bracket 12. The unit 11 thus completed is lowered onto the mounting bracket 12 in the mounting direction represented by an arrow 45 in FIG. 1. In the process, the bolt 15, which on its free end may have a beadlike thickened portion extending all the way around, engages the inside of the elastomer element 17 (or, the elastomer element premounted on the bolt passes through the opening 20 in the leg 13). At the same time, the respective component group 37, comprising the bolt 16, elastomer element 18, and clamping means 34, 35, 36, is inserted into the associated recess 21 or 22, which is open at the top, counter to the mounting direction. In the process, the middle portion 40 on the elastomer element 18 undergoes a radially inward deformation when the funnel-shaped orifice of the recess 21 or 22 is overcome. Upon reaching the terminal position of the unit 11 on the mounting bracket 12, the deformation of the middle portion 40 of the elastomer element 18 is largely undone again because of its intrinsic elasticity.

Next, the respective nut 36 is tightened, so that the bush 34 with the flange 35 experiences a longitudinal displacement on the screw shaft 33, and the elastomer element 18 experiences a bracing in the axial direction, along with radial widening and axial shortening. Because of the axial shortening, the hydraulic unit 11 is displaced in the direction of the second leg 14 of the mounting bracket 12. At the same time, the elastomer element 18 is also displaced inside the opening 20 in the direction of its longitudinal axis, but without losing its positive engagement with the second leg 13 of the mounting bracket 12.

The screwing operation is concluded when the bush 34 strikes the portion 32 of the bolt 16. In this state, shown in FIG. 4, the annular gap 43 of the elastomer element 18 is completely filled by the portion 32 of the bolt 16 and by the bush 34. The elastomer element 18 is deformed in such a way that its middle portion 40, which is surrounded over more than half its circumference by the second leg 14 of the mounting bracket 12, engages the inside of the respective recess 21 or 22 with radial pressure. Conversely, the two end portions 38 and 39 of the elastomer element 18 engage the two side faces 24 and 25 of the second leg 14 with axial pressure. Because of the axial bracing of the elastomer element 18, a connection with the second leg 14 of the mounting bracket 12 by both non-positive and positive engagement is thus attained, which acts to reinforce the impression 26. With the leg of the unit 11 on the mounting bracket 12, which in terms of assembly technology can be favorably achieved, the transmission of interfering vibration of the unit to the vehicle body is largely averted.

The foregoing relates to preferred exemplary embodiments of the invention, it being understood that other variants and embodiments thereof are possible within the spirit and scope of the invention, the latter being defined by the appended claims.

We claim:

1. An apparatus (10) for elastic mounting of a hydraulic unit (11) of a vehicle brake system in a vehicle, comprising:
   a mounting bracket (12) having first (13) and second (14) legs extending at right angles to one another and on which the unit (11) is supported by means of elastomer elements (17, 18) through which bolts (15, 16) pass, the unit (11) being mountable on the bracket (12) in a direction (45) perpendicular to the first leg (13),
   one of said bolts (15), extending in the mounting direction (45) of the unit (11) and into the hydraulic unit, being associated with the first leg (13),
   the second leg (14) of the mounting bracket (12) having at least one recess (21, 22), open counter to the mounting direction (45), for receiving one of the elastomer element (18) with an axis extending perpendicular to the plane of the second leg (14), said one of the elastomer elements (18) being a hollow-cylindrical elastomer element,
   a second of said bolts extending through said hollow-cylindrical elastomer element and into the hydraulic unit,
   the hollow-cylindrical elastomer element (18) associated with the second leg (14) of the mounting bracket (12) having a reduced-diameter middle portion (40), which is placed in the recess (21, 22) of the second leg (14) of the mounting bracket (12);
   the middle portion (40) of the hollow-cylindrical elastomer element (18) being embraced over more than half its circumference by the second leg (14) of the mounting bracket (12);
   the hollow-cylindrical elastomer element (18) associated with the second leg (14) of the mounting bracket (12) being both radially widened and axially shortened by clamping means (34, 35, 36) disposed on the second of said bolts (16); and
   the hollow-cylindrical elastomer element (18) being pressed with its middle portion (40) against the recess (21, 22) and with its end portions (38, 39), adjoining the middle portion (40) on either side, against the two side faces (24, 25), defining the recess (21, 22), of the second leg (14) of the mounting bracket (12).

2. The apparatus of claim 1, wherein two spaced-apart recesses (21, 22) for receiving the hollow-cylindrical elastomer element (18) are embodied on the second leg (14) of the mounting bracket (12) and are located symmetrically to a plane (23) in which the first bolt (15) extends.

3. The apparatus of claim 1, wherein the second of said bolts (16) is press-fined or screwed into the unit (11) and, adjacent to the unit (11), has a portion (32) which engages the inside cross section of the hollow-cylindrical elastomer element (18) and from which a smaller-diameter screw shaft (33) begins, on which screw shaft a bush (34) with a flange (35) and a nut (36), acting as said clamping means, are received.

4. The apparatus of claim 3, wherein the bush (34) engages the inside cross section of the hollow-cylindrical elastomer element (18). while the flange (35) is at least approximately equal in diameter to the hollow-cylindrical elastomer element (18).

5. The apparatus of claim 3, wherein the portion (32) of the second of said bolts (16) adjacent the unit (11) and the bush (34) have a length adapted to the end portions (38, 39) of the hollow-cylindrical elastomer element (18) when the hollow-cylindrical clastomer element is in an unbraced state, and the portion (32) of the second bolt (16) forms a stop for the bush (34).

6. The apparatus of claim 3, wherein the second of said bolts (16); the elastomer element (18), with its second end portion (38) slipped onto the portion (32) of the second bolt (16) adjacent the unit (11); the bush (34), the flange (35) engaging the other end portion (39) of the elastomer element (18); and the nut (36), the nut (36) being screwed onto the screw shaft (33), form a component group (37).

7. The apparatus of claim 1, wherein the elastomer element (17) through which the first bolt (15) passes is received in an opening (20), made in the first leg (13) of the mounting bracket (12), that is shaped at least approximately as an oblong slot whose longitudinal axis extends perpendicular to the plane of the second leg (14) of the mounting bracket (12).

* * * * *